US012168723B2

(12) United States Patent
Hwang et al.

(10) Patent No.: US 12,168,723 B2
(45) Date of Patent: Dec. 17, 2024

(54) STRETCHED POLYESTER FILM AND METHOD FOR PREPARING THE SAME

(71) Applicant: SK CHEMICALS CO., LTD., Seongnam-si (KR)

(72) Inventors: Da-Young Hwang, Seongnam-si (KR); Sangwoo Kim, Seongnam-si (KR); Jiyeon Eom, Seongnam-si (KR); Boo-Youn Lee, Seongnam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 0 days.

(21) Appl. No.: 18/233,566

(22) Filed: Aug. 14, 2023

(65) Prior Publication Data

US 2024/0343870 A1    Oct. 17, 2024

Related U.S. Application Data

(63) Continuation of application No. PCT/KR2023/007889, filed on Jun. 8, 2023.

(30) Foreign Application Priority Data

Apr. 12, 2023   (KR) ........................ 10-2023-0048462

(51) Int. Cl.
| | |
|---|---|
| C08J 5/18 | (2006.01) |
| B29C 48/00 | (2019.01) |
| B29C 48/305 | (2019.01) |
| B29C 55/04 | (2006.01) |
| B29K 67/00 | (2006.01) |
| C08G 63/183 | (2006.01) |
| C08G 63/199 | (2006.01) |
| C08G 63/86 | (2006.01) |

(52) U.S. Cl.
CPC ............... *C08J 5/18* (2013.01); *B29C 48/022* (2019.02); *B29C 48/305* (2019.02); *B29C 55/045* (2013.01); *C08G 63/183* (2013.01); *C08G 63/199* (2013.01); *C08G 63/863* (2013.01); *B29C 2948/92704* (2019.02); *B29K 2067/003* (2013.01); *B29K 2995/0051* (2013.01); *B29K 2995/0097* (2013.01); *C08J 2367/02* (2013.01)

(58) Field of Classification Search
None
See application file for complete search history.

(56) References Cited

U.S. PATENT DOCUMENTS

2019/0330441 A1    10/2019    Shin et al.

FOREIGN PATENT DOCUMENTS

| KR | 10-2009-0062882 A | 6/2009 |
|---|---|---|
| KR | 10-2019-0125929 A | 11/2019 |
| KR | 10-2021-0008511 A | 1/2021 |
| TW | I 720461 | * 3/2021 |
| WO | 2019/217680 A1 | 11/2019 |

OTHER PUBLICATIONS

Machine translation of TWI 720461, (Year: 2021).*
Communication from Korean Patent Office mailed Jun. 22, 2023 in KR Application No. 10-2023-0048462.

* cited by examiner

*Primary Examiner* — Robert T Butcher
(74) *Attorney, Agent, or Firm* — Sughrue Mion, PLLC (57) ABSTRACT

A stretched polyester film and a method for preparing the stretched polyester film are disclosed. The stretched polyester film contains a polyester resin in which a diol component and a dicarboxylic acid component are polymerized, wherein the heat shrinkage rate of the film at 80° C. in the main shrinkage direction is 40% or more, and, upon a first thermal treatment and a second thermal treatment, a first melting temperature ($T_{m1}$) and a second melting temperature ($T_{m2}$) appear when the film is analyzed by differential scanning calorimetry (DSC). The stretched polyester film has excellent heat shrinkability, along with an increased efficiency of a recycling process of waste plastic containers.

10 Claims, 1 Drawing Sheet

STRETCHED POLYESTER FILM AND METHOD FOR PREPARING THE SAME

CROSS REFERENCE TO RELATED APPLICATION

This application is a continuation of International Application No. PCT/KR2023/007889, filed on Jun. 8, 2023 which claims priority from Korean Patent Application No. 10-2023-0048462, filed on Apr. 12, 2023.

TECHNICAL FIELD

The present invention relates to a stretched polyester film having heat shrinkability and controlled crystallinity to increase the efficiency of a recycling process and to a method for preparing the stretched polyester film.

BACKGROUND ART

Polyester among polymers is used as a material in various fields by virtue of its excellent mechanical strength, thermal resistance, transparency, and gas barrier properties.

In particular, heat shrinkable films prepared using a polyester resin have high thermal resistance and appropriate heat shrinkage rate; thus, they are suitable for packaging and/or labels for plastic containers such as PET bottles.

Meanwhile, the use of plastic containers makes real life convenient, whereas environmental problems are becoming very serious due to indiscriminate disposal or excessive use thereof. Accordingly, various methods for recycling waste plastic containers after use are being prepared.

The process of recycling waste plastic containers may be divided into a physical recycling process through washing and crushing and a chemical recycling process through a depolymerization process. However, in order to go through such a recycling process, a pretreatment operation of separating waste plastics by plastic type is required, which reduces the efficiency of the recycling process. For example, in order to recycle a PET bottle to which a polyester film is attached as a label, an operation of separating (removing) the polyester film from the PET bottle must be accompanied. This is attributed to the difference in crystallinity between the polyester resin contained in a polyester film and the PET contained in a PET bottle, which makes the recycling process unworkable when the PET bottle with the polyester film attached is subjected to the recycling process.

Accordingly, in order to increase the efficiency of the recycling process, it is necessary to develop a technology capable of omitting the pretreatment operation of separating (removing) a polyester film from plastic containers such as PET bottles.

PRIOR ART DOCUMENT

Patent Document (Patent Document 1) Korean Laid-open Patent Publication No. 2009-0062882

DISCLOSURE OF INVENTION

Technical Problem

In order to solve the above-mentioned problems in the prior art, the present inventors have conducted various studies. As a result, it has been discovered that a stretched polyester film capable of undergoing a recycling process without being separated (removed) from a waste plastic container is obtained by controlling the crystallinity of the stretched polyester film prepared using a polyester resin.

Accordingly, an object of the present invention is to provide a stretched polyester film with controlled crystallinity and a method for preparing the same.

Solution to Problem

In order to solve the above problems, the present invention provides a stretched polyester film, which comprises a polyester resin in which a diol component and a dicarboxylic acid component are polymerized, wherein the heat shrinkage rate of the film at 80° C. in the main shrinkage direction is 40% or more, and, upon a first thermal treatment and a second thermal treatment, a first melting temperature ($T_{m1}$) and a second melting temperature ($T_{m2}$) appear when the film is analyzed by differential scanning calorimetry (DSC).

In addition, the present invention provides a method for preparing a stretched polyester film, which comprises polymerizing a diol component and a dicarboxylic acid component to prepare a polyester resin; preparing a stretched sheet from the polyester resin; and heat-setting the stretched sheet, wherein the heat shrinkage rate of the film at 80° C. in the main shrinkage direction is 40% or more, and, upon a first thermal treatment and a second thermal treatment, a first melting temperature ($T_{m1}$) and a second melting temperature ($T_{m2}$) appear when the film is analyzed by differential scanning calorimetry (DSC).

Advantageous Effects of Invention

The stretched polyester film according to the present invention has two different melting temperatures ($T_{m1}$ and $T_{m2}$) through thermal treatments under specific conditions, whereby it may have high crystallinity and excellent heat shrinkability.

Therefore, the stretched polyester film according to the present invention can be advantageously used as a heat shrinkable film for packaging and/or labels for plastic containers (e.g., PET bottles).

In addition, the stretched polyester film according to the present invention has a crystallinity similar to that of a highly crystalline plastic container (e.g., PET bottles) through thermal treatments under specific conditions. In a recycling process of waste plastic containers after use, the recycling process of waste plastic containers without separating the stretched polyester film may be possible (for example, it is possible that waste plastic containers as the stretched polyester film that has been subjected to a first thermal treatment and a second thermal treatment is attached are put into the recycling process). As a result, the present invention can increase the efficiency of a recycling process as compared with the prior art.

BEST MODE FOR CARRYING OUT THE INVENTION

Figure 1:
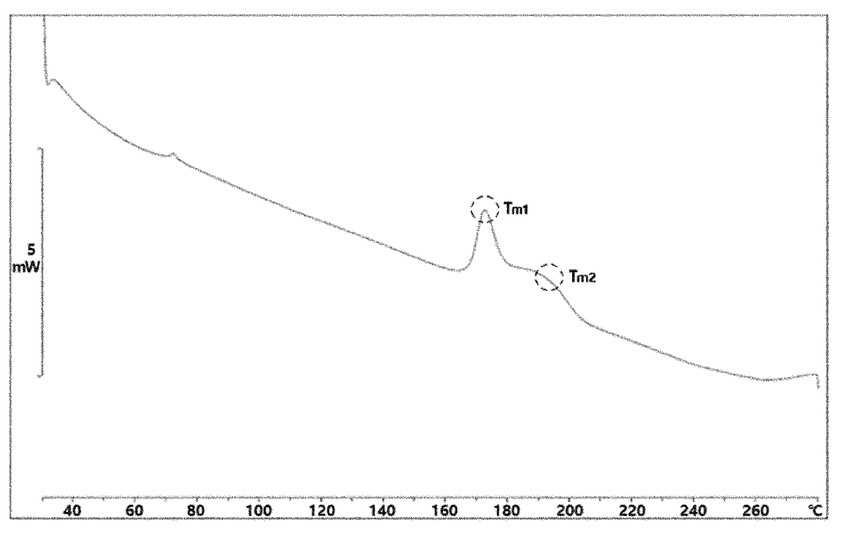
FIGURE is the result (graph) of a DSC analysis of the stretched polyester film according to Example 2 of the present invention.

Hereinafter, the present invention will be described in detail. The present invention herein is not limited to the disclosures given below, but it may be modified into various forms as long as the gist of the invention is not changed.

In the present specification, the term "comprising" is intended to specify a particular characteristic, region, step, process, element, and/or component. It does not exclude the presence or addition of any other characteristic, region, step, process, element and/or component, unless specifically stated to the contrary.

Throughout the present specification, the terms first, second, and the like are used to describe various components. But the components should not be limited by the terms. The terms are used for the purpose of distinguishing one element from another.

All numbers and expressions related to the quantities of components, reaction conditions, and the like used herein are to be understood as being modified by the term "about" unless otherwise indicated.

In general, the melting temperature ($T_m$) of a polymer resin is defined as the limit of the crystallization temperature ($T_c$), which is the temperature at which the crystalline part of the polymer resin begins to melt. A polymer resin having a plurality of melting temperatures ($T_m$) requires a large amount of heat (heat of fusion) to melt the crystalline part, which may be interpreted to mean that the crystallinity of the polymer resin is maximized.

Based on the above, the stretched polyester film of the present invention comprising a polyester resin, which is a polymer resin, has a plurality of melting temperatures ($T_m$) through thermal treatments under specific conditions, whereby it can have maximized crystallinity. That is, the stretched polyester film according to the present invention comprises a polyester resin and has two different melting temperatures ($T_{m1}$ and $T_{m2}$), whereby it has high crystallinity. Hereinafter, this will be described in detail.

Stretched Polyester Film

The stretched polyester film according to the present invention comprises a polyester resin in which a diol component and a dicarboxylic acid component are polymerized, wherein no melting temperature ($T_m$) appears when the film is analyzed by differential scanning calorimetry (DSC), whereas, upon a first thermal treatment and a second thermal treatment, a first melting temperature ($T_{m1}$) and a second melting temperature ($T_{m2}$) appear when the film is analyzed by differential scanning calorimetry (DSC). Specifically, the stretched polyester film according to the present invention is a stretched film prepared from a polyester resin. It can be controlled to have high crystallinity by thermal treatment at a first thermal treatment temperature and subsequent thermal treatment at a second thermal treatment temperature. For example, the stretched polyester film according to the present invention may be a polyester film prepared by thermally treating a stretched film prepared from a polyester resin at a first thermal treatment temperature and then thermally treating it again at a second thermal treatment temperature.

The first thermal treatment temperature is not particularly limited, but it may be 60 to 105° C., specifically, 63 to 104° C., 66 to 103° C., 67 to 102° C., 68 to 100° C., 70 to 100° C., 70 to 98° C., 70 to 97° C., or 70 to 96° C.

In addition, the second thermal treatment temperature is not particularly limited, but it may be 140 to 220° C., specifically, 141 to 219° C., 142 to 218° C., 143 to 217° C., 144 to 216° C., 145 to 215° C., 145 to 214° C., or 146 to 213° C.

As the first and second thermal treatment temperatures are each within the above ranges, the stretched polyester film according to the present invention may have high crystallinity to a required level and excellent heat shrinkability.

The differential scanning calorimeter (DSC) for analyzing the stretched polyester film after the first and second thermal treatments may be specifically a modulated differential scanning calorimeter (modulated DSC or MDSC), more specifically a temperature-modulated differential scanning calorimeter (TMDSC). For analysis by differential scanning calorimetry (DSC), the heating rate condition of 10° C./minute from room temperature to 280° C. may be adopted.

According to the subject invention, the first melting temperature ($T_{m1}$) and the second melting temperature ($T_{m2}$) that appear upon the first and second thermal treatments are not particularly limited, but they may each be 150 to 230° C. Here, the first melting temperature ($T_{m1}$) and the second melting temperature ($T_{m2}$) may be different from each other. Specifically, the first melting temperature ($T_{m1}$) may be lower than the second melting temperature ($T_{m2}$).

That is, the first melting temperature ($T_{m1}$) may be 150 to 230° C., specifically, 152 to 225° C., 154 to 210° C., 156 to 205° C., 158 to 200° C., 160 to 198° C., 165 to 196° C., 170 to 195° C., 172 to 190° C., or 172 to 187° C. In addition, the second melting temperature ($T_{m2}$) may be 150 to 230° C., specifically, 155 to 230° C., 160 to 230° C., 165 to 230° C., 170 to 230° C., 175 to 229° C., 180 to 229° C., 185 to 228° C., 190 to 228° C., or 195 to 228° C. As the first melting temperature ($T_{m1}$) and the second melting temperature ($T_{m2}$) are each within the above ranges, the stretched polyester film according to the present invention may have high crystallinity to a required level, along with excellent heat shrinkability, thermal resistance, and durability.

According to the present invention, the first melting temperature ($T_{m1}$) and the second melting temperature ($T_{m2}$) may have a certain correlation.

Specifically, the first melting temperature ($T_{m1}$) and the second melting temperature ($T_{m2}$) may have a difference ($|T_{m1}-T_{m2}|$) therebetween in a range of 10 to 60° C. More specifically, the difference ($|Tm_1-Tm_2|$) may be 10.5 to 58° C., 11 to 56° C., 11.5 to 54° C., 12 to 52° C., 12.5 to 50° C., 13 to 48° C., or 14 to 46° C.

In addition, the sum of the heats of fusion at the respective first melting temperature ($T_{m1}$) and second melting temperature ($T_{m2}$) may be 3 J/g or more. Specifically, the sum ($H_1+H_2$) of the first heat of fusion ($H_1$) at the first melting temperature ($T_{m1}$) and the second heat of fusion ($H_2$) at the second melting temperature ($T_{m2}$) may be 3 J/g or more, 4 J/g or more, 5 J/g or more, 7 J/g or more, 9 J/g or more, 11 J/g or more, 13 J/g or more, 15 J/g or more, 17 J/g or more, 19 J/g or more, or 20 J/g or more. More specifically, the sum ($H_1+H_2$) may be 3 to 25 J/g, 3.5 to 23 J/g, 4 to 21 J/g, 4.3 to 20 J/g, or 4.5 to 19.5 J/g.

In addition, the ratio ($H_1/H_2$) of the heats of fusion (heats of melting) at the respective first melting temperature ($T_{m1}$) and second melting temperature ($T_{m2}$) may be 0.1 to 10. Specifically, the ratio ($H_1/H_2$) of the first heat of fusion ($H_1$) at the first melting temperature ($Tm_1$) to the second heat of fusion ($H_2$) at the second melting temperature ($Tm_2$) may be 0.1 to 10, more specifically, 0.2 to 9.5, 0.3 to 9, 0.4 to 8.5, 0.5 to 8, 0.6 to 7.9, 0.7 to 7.8, or 0.75 to 7.7.

As the difference ($|T_{m1}-T_{m2}|$), the sum ($H_1+H_2$), and the ratio ($H_1/H_2$) as correlations between the first melting temperature ($Tm_1$) and the second melting temperature ($Tm_2$) are each within the above ranges, the stretched polyester film according to the present invention may have high crystallinity to a required level, along with excellent heat shrinkability, thermal resistance, and durability.

The stretched polyester film according to the present invention may have excellent heat shrinkability. Specifically, the stretched polyester film according to the present invention may have a heat shrinkage rate at 80° C. (for example, when immersed in hot water at 80° C. for 10 seconds) in the main shrinkage direction of 40% or more, specifically, 42% or more, 44% or more, 46% or more, 48% or more, 50% or more, 52% or more, 55% or more, or 60% or more. For example, the heat shrinkage rate at 80° C. in the main shrinkage direction of the stretched polyester film according to the present invention may be 40 to 70%, 41 to 65%, 42 to 60%, 43 to 60%, 44 to 58%, or 45 to 56%.

In addition, the stretched polyester film according to the present invention may have a heat shrinkage rate at 90° C. (for example, when immersed in hot water at 90° C. for 10 seconds) in the main shrinkage direction of 50% or more, specifically, 51% or more, 52% or more, 54% or more, 56% or more, 60% or more, 63% or more, 65% or more, or 70% or more. For example, the heat shrinkage rate at 90° C. in the main shrinkage direction of the stretched polyester film according to the present invention may be 50 to 80%, 51 to 80%, 52 to 80%, 53 to 79%, 54 to 79%, or 55 to 78%.

When the stretched polyester film according to the present invention is heated to 195° C. after the first thermal treatment and the second thermal treatment, it may have a deformation rate of 10% or less according to the following Equation 1. Specifically, the deformation rate may be 0 to 10%, 0.01 to 9.5%, 0.01 to 9%, 0.03 to 8.8%, 0.03 to 8.5%, 0.05 to 8%, 0.05 to 7%, 0.08 to 5%, or 0.1 to 3%. As the deformation rate is within the above range, the recyclability of the stretched polyester film may be excellent. Specifically, the temperature of 195° C. is a temperature adopted in the recycling process of waste plastic containers (e.g., PET bottles). The stretched polyester film according to the present invention has high crystallinity as it has been subjected to the first thermal treatment and the second thermal treatment, so that its melting when heated to 195° C. is minimized. Thus, even if the recycling process is carried out in a state in which it is attached to a waste plastic container, fusion with the waste plastic container does not take place, resulting in excellent recyclability.

$$\text{Deformation rate (\%)} = (F_m/F_T) \times 100 \quad \text{[Equation 1]}$$

In Equation 1, $F_m$ is the total number of stretched polyester film samples that have been melted when heated to 195° C. (when heated to 195° C. after the first thermal treatment and the second thermal treatment), $F_T$ is the total number of stretched polyester film samples before being heated to 195° C. (before being heated to 195° C. after the first thermal treatment and the second thermal treatment), and the size of the stretched polyester film sample is 1 cm in width and 1 cm in length.

The stretched polyester film according to the present invention has excellent heat shrinkability and high crystallinity, it can be advantageously used as a heat shrinkable film for packaging and/or labels for plastic containers (e.g., PET bottles). In particular, the stretched polyester film according to the present invention has been subjected to the first thermal treatment and the second thermal treatment to have a crystallinity similar or equivalent to that of a plastic container (e.g., PET bottles) having high crystallinity (specifically, it has a crystallinity similar or equivalent to that of polyethylene terephthalate (PET) as a component of PET bottles). Since fusion with the plastic container does not take place in the recycling process of a waste plastic container after use, the recycling process of the waste plastic container can be carried out without the step of separating (removing) the stretched polyester film from the waste plastic container.

Therefore, the present invention can increase the efficiency of the recycling process of waste plastic containers as compared with the prior art.

Meanwhile, the polyester resin contained in the stretched polyester film according to the present invention may be a polyester resin in which a diol component and a dicarboxylic acid component are polymerized.

According to the present invention, the diol component may be a commonly known diol component. Specifically, the diol component may comprise at least one selected from the group consisting of bis(2-hydroxyethyl) terephthalate, isosorbide, neopentyl glycol, ethylene glycol, cyclohexanedimethanol, 1,2-propanediol, 1,3-propanediol, 2-methyl-1,3-propanediol, 2-methylene-1,3-propanediol, 2-ethyl-1,3-propanediol, 2-isopropyl-1,3-propanediol, 2,2-dimethyl-1,3-propanediol, 1,4-butanediol, 2,3-butanediol, 3-methyl-1,5-pentanediol, 3-methyl-2,4-pentanediol, 1,6-hexanediol, 1,2-cyclohexanediol, 1,4-cyclohexanediol, diethylene glycol, 4-(hydroxymethyl)cyclohexylmethyl-4-(hydroxymethyl)cyclohexanecarboxylate (CHDM derivative), 4-(4-(hydroxymethyl)cyclohexylmethoxymethyl)cyclohexylmethanol (CHDM derivative), recycled cyclohexanedimethanol, recycled ethylene glycol, recycled bis(2-hydroxyethyl) terephthalate, and recycled diethylene glycol. Preferably, when the crystallinity, heat shrinkability, and economical efficiency of the stretched polyester film are taken into consideration, the diol component may comprise two or more (specifically, 3 or more, 4 or more, or 5 or more) selected from the group consisting of bis(2-hydroxyethyl) terephthalate, isosorbide, ethylene glycol, cyclohexanedimethanol, neopentyl glycol, diethylene glycol, 4-(hydroxymethyl)cyclohexylmethyl-4-(hydroxymethyl)cyclohexanecarboxylate, 4-(4-(hydroxymethyl)cyclohexylmethoxymethyl)cyclohexylmethanol, and recycled bis(2-hydroxyethyl) terephthalate.

For example, the diol component may comprise ethylene glycol and at least one (specifically, 2 or more, 3 or more, or 4 or more) selected from the group consisting of bis(2-hydroxyethyl) terephthalate, isosorbide, cyclohexanedimethanol, neopentyl glycol, diethylene glycol, 4-(hydroxymethyl)cyclohexylmethyl-4-(hydroxymethyl)cyclohexanecarboxylate, 4-(4-(hydroxymethyl)cyclohexylmethoxymethyl)cyclohexylmethanol, and recycled bis(2-hydroxyethyl) terephthalate as a comonomer.

If the diol component comprises ethylene glycol and the comonomer, the amount of these components is not particularly limited, but the amount of ethylene glycol may be 10 to less than 100% by weight, 15 to 90% by weight, 20 to 85% by weight, 30 to 85% by weight, or 50 to 85% by weight, and the amount of the comonomer may be greater than 0 to 90% by weight, greater than 0 to 85% by weight, 1 to 90% by weight, 1 to 50% by weight, 2 to 50% by weight, 10 to 85% by weight, 15 to 80% by weight, 15 to 70% by weight, or 15 to 50% by weight, based on the total weight of the diol component. In particular, when diethylene glycol is used as the comonomer, the amount of diethylene glycol may be 0 to 50% by weight, 1 to 50% by weight, 2 to 50% by weight, 3 to 45% by weight, 4 to 40% by weight, or 5 to 35% by weight, based on the total weight of the diol component. Therefore, the polyester resin according to the present invention may comprise a structural unit derived from diethylene glycol in an amount of 0 to 50% by weight, 1 to 50% by weight, 2 to 50% by weight, 3 to 45% by weight, 4 to 40% by weight, or 5 to 35% by weight, based on the total weight of the polyester resin.

According to the present invention, the dicarboxylic acid component may be a commonly known dicarboxylic acid.

Specifically, the dicarboxylic acid component may comprise at least one selected from the group consisting of isophthalic acid, terephthalic acid, dimethyl isophthalate, phthalic acid, dimethyl phthalate (dimethyl terephthalate), phthalic anhydride, 2,6-naphthalenedicarboxylic acid, dimethyl 2,6-naphthalenedicarboxylate, diphenyl dicarboxylic acid, 1,4-cyclohexanedicarboxylic acid, 1,3-cyclohexanedicarboxylic acid, dimethyl 1,4-cyclohexanedicarboxylate, dimethyl 1,3-cyclohexanedicarboxylate, sebacic acid, succinic acid, isodecylsuccinic acid, maleic acid, maleic anhydride, fumaric acid, adipic acid, glutaric acid, azelaic acid, recycled isophthalic acid, recycled terephthalic acid, recycled dimethyl isophthalate, and recycled dimethyl phthalate (recycled dimethyl terephthalate). Preferably, when the crystallinity and heat shrinkability of the stretched polyester film are taken into consideration, the dicarboxylic acid component may comprise at least one selected from the group consisting of isophthalic acid, terephthalic acid, dimethyl phthalate, and dimethyl isophthalate.

According to the present invention, the polyester resin may have an intrinsic viscosity (IV) of 0.5 to 1.2 dl/g at 35° C., specifically, 0.52 to 1.15 dl/g, 0.55 to 1.13 dl/g, 0.58 to 1.1 dl/g, 0.6 to 0.9 dl/g, 0.62 to 0.88 dl/g, 0.65 to 0.85 dl/g, 0.68 to 0.83 dl/g, or 0.7 to 0.8 dl/g. As the intrinsic viscosity is within the above range, the processability of the polyester resin may be secured.

Method for Preparing a Stretched Polyester Film

The present invention provides a method for preparing the stretched polyester film described above. Specifically, the method for preparing a stretched polyester film according to the present invention comprises polymerizing a diol component and a dicarboxylic acid component to prepare a polyester resin (S-1); preparing a stretched sheet from the polyester resin (S-2); and heat-setting the stretched sheet (S-3).

Step (S-1): Preparation of a Polyester Resin

In step (S-1), a diol component and a dicarboxylic acid component are polymerized to prepare a polyester resin (a copolymer). Since the diol component and the dicarboxylic acid component for the polymerization are the same as described above, a description thereon is omitted.

The polymerization of the diol component and the dicarboxylic acid component may be carried out by a conventionally known method (e.g., liquid phase polymerization, solid phase polymerization, or the like). A batch reactor or a continuous reactor may be used for the polymerization reaction. Specifically, the polymerization reaction may comprise an esterification reaction (transesterification reaction) of preparing an oligomer by reacting a diol component with a dicarboxylic acid component and a polycondensation reaction of the oligomer.

The temperature at which the esterification reaction is carried out is not particularly limited, but it may be 230 to 270° C., 235 to 268° C., 240 to 265° C., or 240 to 260° C., when the physical properties of a polyester resin and a stretched polyester film are taken into consideration. In addition, the period of time during which the esterification reaction is carried out is not particularly limited, but it may be 1 to 24 hours, 2 to 22 hours, 3 to 20 hours, or 4 to 18 hours. In addition, the pressure at which the esterification reaction is carried out is not particularly limited, but it may be 0 to 5.0 kgf/cm$^2$, 0.1 to 4.5 kgf/cm$^2$, 0.1 to 4.0 kgf/cm$^2$, or 0.1 to 3.0 kgf/cm$^2$.

The temperature at which the polycondensation reaction is carried out is not particularly limited, but it may be 245 to 290° C., 250 to 285° C., 255 to 280° C., or 255 to 270° C., when the physical properties of a polyester resin and a stretched polyester film are taken into consideration. In addition, the period of time during which the polycondensation reaction is carried out is not particularly limited, but it may be 1 to 24 hours, 2 to 24 hours, 5 to 22 hours, or 7 to 20 hours.

Meanwhile, an additive comprising at least one selected from the group consisting of a catalyst, a stabilizer, a colorant, a crystallizing agent, an antioxidant, and a branching agent may be employed in the polymerization reaction.

The catalyst is not particularly limited, but it may specifically be methylates of sodium and magnesium; acetates, borates, fatty acid salts or carbonate of Zn, Cd, Mn, Co, Ca, Ba, and oxides or hydrates of Mg, Pb, Mn, Ti, Zn, Sb, and Ge. For example, the catalyst may be tetraethyl titanate, acetyltripropyl titanate, tetrapropyl titanate, tetrabutyl titanate, 2-ethylhexyl titanate, octylene glycol titanate, triethanolamine titanate, acetylacetonate titanate, ethylacetoacetic ester titanate, isostearyl titanate, titanium dioxide, germanium dioxide, germanium tetrachloride, germanium ethyleneglycoxide, germanium acetate, or combinations thereof.

The stabilizer is not particularly limited, but a phosphorus-based compound such as phosphoric acid, trimethyl phosphate, and triethyl phosphate may be used.

The colorant is not particularly limited, but organic compounds such as cobalt-based compounds, anthraquinone-based compounds, perinone-based compounds, azo-based compounds, and methine-based compounds (for example, cobalt acetate, cobalt propionate, Polysynthren Blue RLS toner of Clarient, and Solvaperm Red BB toner of Clarient) may be used.

The crystallizing agent is not particularly limited, but a crystal nucleating agent, an ultraviolet absorber, a polyolefin resin, a polyamide resin, or the like may be used.

The antioxidant is not particularly limited, but hindered phenol-based compounds, phosphite-based compounds, thioether-based compounds, or the like may be used.

The branching agent is not particularly limited, but trimellitic anhydride, trimethylol propane, trimellitic acid, or the like may be used.

Step (S-2): Preparation of a Stretched Sheet

In step (S-2), a stretched sheet is prepared from the polyester resin obtained in step (S-1). The preparation of the stretched sheet may be carried out by a conventionally known method. Specifically, a stretched sheet may be prepared through a melting and casting step of a polyester resin, a uniaxial or biaxial stretching step, and the like.

The melting and casting step of the polyester resin may be carried out through an extruder. In such an event, the melting temperature is not particularly limited, but it may be 180 to 310° C., 200 to 310° C., 230 to 310° C., 240 to 300° C., or 250 to 290° C. An unstretched sheet may be obtained through such a step, and the unstretched sheet thus obtained may be transferred to a stretching step. The unstretched sheet may be preheated to a predetermined temperature (e.g., 90 to 120° C.) before going through the stretching step.

The uniaxial or biaxial stretching step may comprise a step of stretching the unstretched sheet obtained through the melting and casting step in the longitudinal direction (MD), the transverse direction (TD), or both directions. Stretching in the longitudinal direction may be carried out at a stretching ratio of 1 to 5 times or 1.1 to 4.5 times at 55 to 180° C. or 60 to 170° C. In addition, stretching in the transverse direction may be carried out at a stretching ratio of 1.5 to 6 times or 2.5 to 5.5 times at 55 to 180° C. or 60 to 170° C.

Step (S-3): Heat Setting

In step (S-3), the stretched sheet obtained in step (S-2) is heat set. The temperature at which the stretched sheet is heat set is not particularly limited, but it may be similar to, or higher than, the temperature of the stretching step. Specifically, the heat-setting temperature may be 60 to 200° C., 65 to 190° C., 65 to 180° C., or 65 to 170° C. As the heat-setting temperature is within the above range, a stretched polyester film having high crystallinity and high mechanical strength may be prepared.

The stretched polyester film prepared through such a heat-setting step may have a heat shrinkage rate at 80° C. in the main shrinkage direction of 40% or more, specifically, 42% or more, 44% or more, 46% or more, 48% or more, 50% or more, 52% or more, 55% or more, or 60% or more. For example, the heat shrinkage rate at 80° C. in the main shrinkage direction may be 40 to 70%, 41 to 65%, 42 to 60%, 43 to 60%, 44 to 58%, or 45 to 56%.

In addition, the stretched polyester film prepared through such a heat-setting step may have a heat shrinkage rate at 90° C. in the main shrinkage direction of 50% or more, specifically, 51% or more, 52% or more, 54% or more, 56% or more, 60% or more, 63% or more, 65% or more, or 70% or more. For example, the heat shrinkage rate at 90° C. in the main shrinkage direction may be 50 to 80%, 51 to 80%, 52 to 80%, 53 to 79%, 54 to 79%, or 55 to 78%.

In the stretched polyester film prepared through the above steps according to the present invention, upon a first thermal treatment and a second thermal treatment, a first melting temperature ($T_{m1}$) and a second melting temperature ($T_{m2}$) as described above appear when it is analyzed by the differential scanning calorimetry (DSC) as described above, so that it may have high crystallinity, along with excellent heat shrinkability, thermal resistance, and durability.

The first thermal treatment temperature is not particularly limited, but it may be 60 to 105° C., specifically, 63 to 104° C., 66 to 103° C., 67 to 102° C., 68 to 100° C., 70 to 100° C., 70 to 98° C., 70 to 97° C., or 70 to 96° C. For example, the first thermal treatment may be carried out by immersing the stretched polyester film obtained through the heat-setting in step (S-3) in hot water having the above temperature range for 5 to 15 seconds. In addition, the first thermal treatment may be carried out by placing the stretched polyester film obtained through the heat-setting in an oven having the above temperature range and applying the above temperature range to carry out thermal treatment for 5 to 15 seconds.

The second thermal treatment temperature is not particularly limited, but it may be 140 to 220° C., specifically, 141 to 219° C., 142 to 218° C., 143 to 217° C., 144 to 216° C., 145 to 215° C., 145 to 214° C., or 146 to 213° C. For example, the second thermal treatment may be carried out by placing the stretched polyester film subjected to the first thermal treatment in an oven and applying the above temperature range to carry out thermal treatment for 15 to 45 minutes.

MODE FOR THE INVENTION

Hereinafter, the present invention will be described in more detail with reference to embodiments. However, these examples are provided only for illustration purposes, and the present invention is not limited thereto.

Example 1

(1) Preparation of a Polyester Resin (Copolymer)

A 10-liter reactor equipped with a column and a condenser that can be cooled by water was charged with terephthalic acid (TPA, 7,693.0 g), isosorbide (ISB, 96.7 g), ethylene glycol (EG, 2,601.3 g), 1,4-cyclohexanedimethanol (CHDM, 1,557.1 g), diethylene glycol (DEG, 1,213.7 g), a Ge catalyst ($GeO_2$, 1.0 g), a Ti catalyst (1.0 g), phosphoric acid (1.5 g), a blue toner (0.01 g), and a red toner (0.005 g). Next, after the temperature of the reactor was raised to 265° C., an esterification reaction (ES) was carried out at 265° C. under a pressure of 2 kgf/cm² to obtain a transparent resultant.

Subsequently, the resultant was transferred to a polycondensation reactor, and a polycondensation reaction (PA) was then carried out at 270° C. while the pressure of the polycondensation reactor was maintained at a lower pressure than normal pressure. When the intrinsic viscosity (IV) of the mixture in the polycondensation reactor reached 0.77 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 μm.

Thereafter, the stretched polyester film was subjected to a first thermal treatment by immersing the stretched polyester film in hot water at 70° C. for 10 seconds in order to control the crystallinity of the stretched polyester film. Next, the stretched polyester film subjected to the first thermal treatment was stored in an oven at 160° C. for 30 minutes to carry out a second thermal treatment.

Example 2

(1) Preparation of a Polyester Resin (Copolymer)

A 10-liter reactor equipped with a column and a condenser that can be cooled by water was charged with terephthalic acid (TPA, 7,663.2 g), ethylene glycol (EG, 3,345.5 g), 1,4-cyclohexanedimethanol (CHDM, 1,255.7 g), neopentyl glycol (NPG, 106.7 g), diethylene glycol (DEG, 978.7 g), a cyclohexanedimethanol derivative (CHDM derivative, 247.4 g), a Ti catalyst (1.0 g), a blue toner (0.01 g), and a red toner (0.01 g). Next, after the temperature of the reactor was raised to 255° C., an esterification reaction (ES) was carried out at 255° C. under a pressure of 1 kgf/cm² to obtain a transparent resultant.

Subsequently, the resultant was transferred to a polycondensation reactor, and a polycondensation reaction (PA) was then carried out at 285° C. while the pressure of the polycondensation reactor was maintained at a lower pressure than normal pressure. When the intrinsic viscosity (IV) of the mixture in the polycondensation reactor reached 0.65 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 μm.

Thereafter, the stretched polyester film was subjected to a first thermal treatment by immersing the stretched polyester film in hot water at 90° C. for 10 seconds in order to control the crystallinity of the stretched polyester film. Next, the stretched polyester film subjected to the first thermal treatment was stored in an oven at 175° C. for 30 minutes to carry out a second thermal treatment.

Example 3

(1) Preparation of a Polyester Resin (Copolymer)

A 10-liter reactor equipped with a column and a condenser that can be cooled by water was charged with recycled bis(2-hydroxyethyl) terephthalate (r-BHET, 1,202.9 g), terephthalic acid (TPA, 7,075.2 g), ethylene glycol (EG, 3,488.9 g), 1,4-cyclohexanedimethanol (CHDM, 1,363.9 g), diethylene glycol (DEG, 1,063.0 g), a Ti catalyst (1.0 g), a blue toner (0.02 g), and a red toner (0.01 g). Next, after the temperature of the reactor was raised to 255° C., an esterification reaction (ES) was carried out at 255° C. under a pressure of 0.5 kgf/cm$^2$ to obtain a transparent resultant.

Subsequently, the resultant was transferred to a polycondensation reactor, and a polycondensation reaction (PA) was then carried out at 285° C. while the pressure of the polycondensation reactor was maintained at a lower pressure than normal pressure. When the intrinsic viscosity (IV) of the mixture in the polycondensation reactor reached 0.70 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 μm.

Thereafter, the stretched polyester film was subjected to a first thermal treatment by immersing the stretched polyester film in hot water at 95° C. for 10 seconds in order to control the crystallinity of the stretched polyester film. Next, the stretched polyester film subjected to the first thermal treatment was stored in an oven at 155° C. for 30 minutes to carry out a second thermal treatment.

Example 4

(1) Preparation of a Polyester Resin (Copolymer)

A 10-liter reactor equipped with a column and a condenser that can be cooled by water was charged with terephthalic acid (TPA, 7,918.3 g), ethylene glycol (EG, 4,080.5 g), 1,4-cyclohexanedimethanol (CHDM, 1,068.5 g), diethylene glycol (DEG, 832.8 g), a Ge catalyst (GeO$_2$, 1.0 g), a blue toner (0.05 g), and a red toner (0.02 g). Next, after the temperature of the reactor was raised to 260° C., an esterification reaction (ES) was carried out at 260° C. under a pressure of 1 kgf/cm$^2$ to obtain a transparent resultant.

Subsequently, the resultant was transferred to a polycondensation reactor, and a polycondensation reaction (PA) was then carried out at 275° C. while the pressure of the polycondensation reactor was maintained at a lower pressure than normal pressure. When the intrinsic viscosity (IV) of the mixture in the polycondensation reactor reached 0.78 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 μm.

Thereafter, the stretched polyester film was subjected to a first thermal treatment by immersing the stretched polyester film in hot water at 95° C. for 10 seconds in order to control the crystallinity of the stretched polyester film. Next, the stretched polyester film subjected to the first thermal treatment was stored in an oven at 165° C. for 30 minutes to carry out a second thermal treatment.

Example 5

(1) Preparation of a Polyester Resin (Copolymer)

A 10-liter reactor equipped with a column and a condenser that can be cooled by water was charged with dimethyl phthalate (DMT, 7,878.5 g), isosorbide (ISB, 494.9 g), ethylene glycol (EG, 4,076.7 g), 1,4-cyclohexanedimethanol (CHDM, 1,139.1 g), diethylene glycol (DEG, 887.8 g), an Mn catalyst (Mn (II) acetate tetrahydrate, 1.5 g), an Sb catalyst (Sb$_2$O$_3$, 1.8 g), and cobalt acetate (0.8 g). Next, after the temperature of the reactor was raised to 240° C., an esterification reaction (ES) was carried out at 240° C. under a pressure of 0.1 kgf/cm$^2$ to obtain a transparent resultant.

Subsequently, the resultant was transferred to a polycondensation reactor, and a polycondensation reaction (PA) was then carried out at 255° C. while the pressure of the polycondensation reactor was maintained at a lower pressure than normal pressure. When the intrinsic viscosity (IV) of the mixture in the polycondensation reactor reached 0.85 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 μm.

Thereafter, the stretched polyester film was subjected to a first thermal treatment by immersing the stretched polyester film in hot water at 95° C. for 10 seconds in order to control the crystallinity of the stretched polyester film. Next, the stretched polyester film subjected to the first thermal treatment was stored in an oven at 175° C. for 30 minutes to carry out a second thermal treatment.

Example 6

(1) Preparation of a Polyester Resin (Copolymer)

A 10-liter reactor equipped with a column and a condenser that can be cooled by water was charged with terephthalic acid (TPA, 8,279.3 g), ethylene glycol (EG, 4,432.3 g), neopentyl glycol (NPG, 864.5 g), a Ge catalyst ($GeO_2$, 1.0 g), cobalt acetate (0.4 g), a blue toner (0.03 g), and a red toner (0.01 g). Next, after the temperature of the reactor was raised to 250° C., an esterification reaction (ES) was carried out at 250° C. under a pressure of 1 kgf/cm² to obtain a transparent resultant.

Subsequently, the resultant was transferred to a polycondensation reactor, and a polycondensation reaction (PA) was then carried out at 285° C. while the pressure of the polycondensation reactor was maintained at a lower pressure than normal pressure. When the intrinsic viscosity (IV) of the mixture in the polycondensation reactor reached 0.70 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 μm.

Thereafter, the stretched polyester film was subjected to a first thermal treatment by immersing the stretched polyester film in hot water at 95° C. for 10 seconds in order to control the crystallinity of the stretched polyester film. Next, the stretched polyester film subjected to the first thermal treatment was stored in an oven at 160° C. for 30 minutes to carry out a second thermal treatment.

Example 7

(1) Preparation of a Polyester Resin (Copolymer)

A 10-liter reactor equipped with a column and a condenser that can be cooled by water was charged with recycled bis(2-hydroxyethyl) terephthalate (r-BHET, 2,288.5 g), terephthalic acid (TPA, 5,982.5 g), ethylene glycol (EG, 739.3 g), 1,4-cyclohexanedimethanol (CHDM, 1,441.6 g), neopentyl glycol (NPG, 1,301.4 g), diethylene glycol (DEG, 1,123.6 g), a Ge catalyst ($GeO_2$, 1.0 g), a blue toner (0.03 g), and a red toner (0.01 g). Next, after the temperature of the reactor was raised to 265° C., an esterification reaction (ES) was carried out at 265° C. under a pressure of 2 kgf/cm² to obtain a transparent resultant.

Subsequently, the resultant was transferred to a polycondensation reactor, and a polycondensation reaction (PA) was then carried out at 270° C. while the pressure of the polycondensation reactor was maintained at a lower pressure than normal pressure. When the intrinsic viscosity (IV) of the mixture in the polycondensation reactor reached 0.78 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 μm.

Thereafter, the stretched polyester film was subjected to a first thermal treatment by immersing the stretched polyester film in hot water at 100° C. for 10 seconds in order to control the crystallinity of the stretched polyester film. Next, the stretched polyester film subjected to the first thermal treatment was stored in an oven at 210° C. for 30 minutes to carry out a second thermal treatment.

Comparative Example 1

(1) Preparation of a Polyester Resin (Copolymer)

A 10-liter reactor equipped with a column and a condenser that can be cooled by water was charged with recycled bis(2-hydroxyethyl) terephthalate (r-BHET, 2,256.8 g), terephthalic acid (TPA, 5,899.6 g), ethylene glycol (EG, 824.5 g), 1,4-cyclohexanedimethanol (CHDM, 2,487.8 g), diethylene glycol (DEG, 1,939.0 g), a Ge catalyst ($GeO_2$, 1.0 g), a blue toner (0.01 g), and a red toner (0.01 g). Next, after the temperature of the reactor was raised to 273° C., an esterification reaction (ES) was carried out at 273° C. under a pressure of 0.5 kgf/cm² to obtain a transparent resultant.

Subsequently, the resultant was transferred to a polycondensation reactor, and a polycondensation reaction (PA) was then carried out at 285° C. while the pressure of the polycondensation reactor was maintained at a lower pressure than normal pressure. When the intrinsic viscosity (IV) of the mixture in the polycondensation reactor reached 0.80 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 µm.

Thereafter, the stretched polyester film was subjected to a first thermal treatment by immersing the stretched polyester film in hot water at 110° C. for 10 seconds in order to control the crystallinity of the stretched polyester film. Next, the stretched polyester film subjected to the first thermal treatment was stored in an oven at 225° C. for 30 minutes to carry out a second thermal treatment.

Comparative Example 2

(1) Preparation of a Polyester Resin (Copolymer)

A 10-liter reactor equipped with a column and a condenser that can be cooled by water was charged with recycled bis(2-hydroxyethyl) terephthalate (r-BHET, 2,509.9 g), terephthalic acid (TPA, 6,561.3 g), ethylene glycol (EG, 3,281.5 g), 1,4-cyclohexanedimethanol (CHDM, 790.5 g), diethylene glycol (DEG, 616.1 g), a Ti catalyst (1.0 g), a blue toner (0.01 g), and a red toner (0.01 g). Next, after the temperature of the reactor was raised to 263° C., an esterification reaction (ES) was carried out at 263° C. under a pressure of 1 kgf/cm² to obtain a transparent resultant.

Subsequently, the resultant was transferred to a polycondensation reactor, and a polycondensation reaction (PA) was then carried out at 275° C. while the pressure of the polycondensation reactor was maintained at a lower pressure than normal pressure. When the intrinsic viscosity (IV) of the mixture in the polycondensation reactor reached 0.70 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 µm.

Thereafter, the stretched polyester film was subjected to a first thermal treatment by immersing the stretched polyester film in hot water at 80° C. for 10 seconds in order to control the crystallinity of the stretched polyester film. Next, the stretched polyester film subjected to the first thermal treatment was stored in an oven at 170° C. for 30 minutes to carry out a second thermal treatment.

Comparative Example 3

(1) Preparation of a Polyester Resin (Copolymer)

A 10-liter reactor equipped with a column and a condenser that can be cooled by water was charged with terephthalic acid (TPA, 7,918.3 g), ethylene glycol (EG, 4,080.5 g), 1,4-cyclohexanedimethanol (CHDM, 1,068.5 g), diethylene glycol (DEG, 832.8 g), a Ge catalyst (GeO₂, 1.0 g), a blue toner (0.05 g), and a red toner (0.02 g). Next, after the temperature of the reactor was raised to 260° C., an esterification reaction (ES) was carried out at 260° C. under a pressure of 1 kgf/cm² to obtain a transparent resultant.

Subsequently, the resultant was transferred to a polycondensation reactor, and a polycondensation reaction (PA) was then carried out at 275° C. while the pressure of the polycondensation reactor was maintained at a lower pressure than normal pressure. When the intrinsic viscosity (IV) of the mixture in the polycondensation reactor reached 0.78 dl/g, the mixture was then discharged to the outside of the polycondensation reactor to form strands, which were solidified with a cooling liquid and then granulated to have an average weight of about 12 to 14 mg to prepare polyester resin (copolymer) chips.

(2) Preparation of a Stretched Polyester Sheet

The polyester resin chips were fed to an extruder, melt-extruded at a temperature of 180 to 310° C., and cast at a temperature of 20 to 70° C. to prepare an unstretched polyester sheet. Subsequently, the unstretched film was heated to 75° C. to 90° C. and stretched 5 times in the transverse direction (TD) to prepare a stretched polyester sheet.

(3) Heat Setting

The stretched polyester sheet was heat set at 60 to 200° C. to prepare a stretched polyester film having a thickness of 50 µm.

Thereafter, the stretched polyester film was subjected to a first thermal treatment by immersing the stretched polyester film in hot water at 65° C. for 10 seconds in order to control the crystallinity of the stretched polyester film.

Test Example 1

The stretched polyester films thermally treated in Examples 1 to 7 and Comparative Examples 1 to 3 were each analyzed by differential scanning calorimetry (DSC) to determine whether a melting temperature ($T_m$) appeared. The results are shown in Table 1 below and the figure. The DSC analysis of the stretched polyester film was carried out as follows.

DSC analysis device: DSC 1 model of Mettler Toledo was used.

Sample preparation: About 6-10 mg of a stretched polyester film subjected to first, or first and second, thermal treatment was taken and filled into an aluminum pan.

Scan conditions: it was heated from room temperature to 280° C. at a rate of 10° C., followed by annealing at 280° C. for 3 minutes to obtain a DSC curve.

Confirmation of melting temperature: The temperature at which an endothermic peak appeared during the temperature elevation procedure in the obtained DSC curve was defined as the melting temperature. Thereafter, melting temperatures ($T_{m1}$, $T_{m2}$), $|T_{m1}-T_{m2}|$, $H_1+H_2$, and $H_1/H_2$ were calculated based on the results obtained. Here, $|T_{m1}-T_{m2}|$ was rounded to the second decimal places.

Test Example 2

In Examples 1 to 7 and Comparative Examples 1 to 3, the heat shrinkage rate of each of the stretched polyester films before thermal treatment (stretched polyester films before first, or first and second, thermal treatment) was evaluated as follows. The results are shown in Table 1 below.

Sample preparation: the stretched polyester films were each cut into a size of 5 cm×5 cm and stored at room temperature (20° C.).

Heat shrinkage at 80° C.: The stretched polyester film sample was immersed in hot water at 80° C. for 10 seconds, and the change in length in the transverse direction (TD), which is the main shrinkage direction, was calculated by the following Equation 2.

Heat shrinkage at 90° C.: The stretched polyester film sample was immersed in hot water at 90° C. for 10 seconds, and the change in length in the transverse direction (TD), which is the main shrinkage direction, was calculated by the following Equation 2.

$$\text{Heat shrinkage rate (\%)} = \{(F_{S1} - F_{S2})/F_{S1}\} \times 100 \quad \text{[Equation 2]}$$

In Equation 2, $F_{S1}$: Length of the stretched polyester film sample in the transverse direction (TD) before immersion in hot water, and $F_{S2}$: Length of the stretched polyester film sample in the transverse direction (TD) after immersion in hot water.

Test Example 3

In Examples 1 to 7 and Comparative Examples 1 to 3, the recyclability of each of the stretched polyester films thermally treated was evaluated as follows. The results are shown in Table 1 below.

Sample preparation: the stretched polyester films subjected to first, or first and second, thermal treatment were each cut into a size of 1 cm×1 cm and stored at room temperature (20° C.).

Test conditions: 100 polyester stretched film samples were placed on a Teflon-coated plate and heated in an oven at 195° C. (temperature of PET recycling processes) for 30 minutes. Then, the deformation rate of the stretched polyester film was calculated according to the following Equation 1. When the deformation rate was less than 10%, the recyclability was evaluated as excellent. When a stretched polyester film sample was melted and adhered to the plate without being detached therefrom, it fell under the case where the stretched film sample was melted in Equation 1.

$$\text{Deformation rate (\%)} = (F_m/F_T) \times 100 \quad \text{[Equation 1]}$$

In Equation 1, $F_m$ is the total number of stretched polyester film samples that were melted when heated to 195° C., and $F_T$ is the total number of stretched polyester film samples before being heated to 195° C.

◎: deformation rate of 0 to 5%
○: deformation rate of greater than 5% to 10%
x: deformation rate of greater than 10%

Referring to Table 1, the stretched polyester films of Examples 1 to 7, each of which had two melting temperatures ($T_{m1}$ and $T_{m2}$) (see the figure), while $|T_{m1}-T_{m2}|$, $H_1+H_2$, and $H_1/H_2$ were controlled within the scope of the present invention, had high heat shrinkage rates at each temperature and ensured recyclability.

In contrast, the stretched polyester film of Comparative Example 1 that had one melting temperature had significantly poor recyclability. The stretched polyester film of Comparative Example 2, in which a low amount of a comonomer (e.g., diethylene glycol) was employed, had a low heat shrinkage rate. In addition, the stretched polyester film of Comparative Example 3, in which only the first thermal treatment (one time) was carried out, had significantly poor recyclability.

The invention claimed is:

1. A stretched polyester film, which comprises a single crystalline polyester resin in which a diol component and a dicarboxylic acid component are polymerized,
   wherein the single crystalline polyester resin consists of a single polyester material,
   wherein a heat shrinkage rate of the stretched polyester film at 80° C. in main shrinkage direction is 40% or more, and, upon a first thermal treatment and a second thermal treatment, a first melting temperature ($T_{m1}$) and a second melting temperature ($T_{m2}$) appear when the stretched polyester film is analyzed by differential scanning calorimetry (DSC),
   wherein the first melting temperature ($T_{m1}$) is 150 to 230° C., the second melting temperature ($T_{m2}$) is 150 to 230° C., and the first melting temperature ($T_{m1}$) and the second melting temperature ($T_{m2}$) are different from each other,
   wherein a difference ($|T_{m1}-T_{m2}|$) between the first melting temperature ($T_{m1}$) and the second melting temperature ($T_{m2}$) is in a range of 10 to 60° C.,
   wherein the first thermal treatment temperature is 60 to 105° C.,
   wherein the second thermal treatment temperature is 140 to 220° C., and
   wherein a ratio ($H_1/H_2$) of a first heat of fusion ($H_1$) at the first melting temperature ($T_{m1}$) to a second heat of fusion ($H_2$) at the second melting temperature ($T_{m2}$) is 0.1 to 10.

2. The stretched polyester film of claim 1, wherein a sum ($H_1+H_2$) of the first heat of fusion ($H_1$) at the first melting temperature ($T_{m1}$) and the second heat of fusion ($H_2$) at the second melting temperature ($T_{m2}$) is 3 J/g or more.

TABLE 1

| | $T_{m1}$ (° C.) | $T_{m2}$ (° C.) | $|T_{m1}-T_{m2}|$ (° C.) | $H_1+H_2$ (J/g) | $H_1/H_2$ | Shrinkage rate (80° C., %) | Shrinkage rate (90° C., %) | Recyclability |
|---|---|---|---|---|---|---|---|---|
| Ex. 1 | 173.3 | 196.9 | 23.6 | 7.53 | 3.35 | 52 | 67 | ◎ |
| Ex. 2 | 172.52 | 194.08 | 21.6 | 16.61 | 1.91 | 48 | 59 | ◎ |
| Ex. 3 | 181.5 | 195.6 | 14.1 | 4.5 | 7.67 | 55 | 68 | ◎ |
| Ex. 4 | 173.46 | 199.36 | 25.9 | 19.02 | 1.50 | 45 | 57 | ◎ |
| Ex. 5 | 174.13 | 227.72 | 53.6 | 6.9 | 6.52 | 44 | 55 | ◎ |
| Ex. 6 | 181.1 | 208.13 | 27.0 | 11.64 | 0.76 | 46 | 55 | ○ |
| Ex. 7 | 181.49 | 209.21 | 27.7 | 8.11 | 1.17 | 45 | 55 | ○ |
| C. Ex. 1 | 164.8 | — | — | 0.5 | — | 65 | 70 | X |
| C. Ex. 2 | 188 | 234.5 | 46.5 | 1.5 | 0.65 | 25 | 35 | ◎ |
| C. Ex. 3 | 183.3 | — | — | 0.5 | — | 45 | 57 | X |

3. The stretched polyester film of claim 1, wherein the diol component comprises one or more selected from the group consisting of bis(2-hydroxyethyl) terephthalate, isosorbide, neopentyl glycol, ethylene glycol, cyclohexanedimethanol, 1,2-propanediol, 1,3-propanediol, 2-methyl-1,3-propanediol, 2-methylene-1,3-propane diol, 2-ethyl-1,3-propanediol, 2-isopropyl-1,3-propanediol, 2,2-dimethyl-1,3-propanediol, 1,4-butanediol, 2,3-butanediol, 3-methyl-1,5-pentanediol, 3-methyl-2,4-pentanediol, 1,6-hexanediol, 1,2-cyclohexanediol, 1,4-cyclohexanediol, diethylene glycol, 4-(hydroxymethyl)cyclohexylmethyl-4-(hydroxymethyl)cyclohexanecarboxylate, 4-(4-(hydroxymethyl)cyclohexylmethoxymethyl)cyclohexylmethanol, recycled cyclohexanedimethanol, recycled ethylene glycol, recycled bis(2-hydroxyethyl) terephthalate, and recycled diethylene glycol.

4. The stretched polyester film of claim 1, wherein the dicarboxylic acid component comprises one or more selected from the group consisting of isophthalic acid, terephthalic acid, dimethyl isophthalate, phthalic acid, dimethyl phthalate, phthalic anhydride, 2,6-naphthalenedicarboxylic acid, dimethyl 2,6-naphthalenedicarboxylate, diphenyl dicarboxylic acid, 1,4-cyclohexanedicarboxylic acid, 1,3-cyclohexanedicarboxylic acid, dimethyl 1,4-cyclohexanedicarboxylate, dimethyl 1,3-cyclohexanedicarboxylate, sebacic acid, succinic acid, isodecylsuccinic acid, maleic acid, maleic anhydride, fumaric acid, adipic acid, glutaric acid, azelaic acid, recycled isophthalic acid, recycled terephthalic acid, recycled dimethyl isophthalate, and recycled dimethyl phthalate.

5. The stretched polyester film of claim 1, which has a heat shrinkage rate at 90° C. in the main shrinkage direction of 50% or more.

6. The stretched polyester film of claim 1, wherein the polyester resin has an intrinsic viscosity (IV) of 0.5 dl/g to 1.2 dl/g.

7. The stretched polyester film of claim 1, wherein, when the stretched polyester film is heated to 195° C. after the first thermal treatment and the second thermal treatment, the stretched polyester film has a deformation rate of 10% or less according to the following Equation 1:

$$\text{Deformation rate (\%)} = (F_m/F_T) \times 100 \quad \text{[Equation 1]}$$

in Equation 1, $F_m$ is a total number of stretched polyester film samples that are melted when heated to 195° C., $F_T$ is a total number of stretched polyester film samples before being heated to 195° C., and a size of the stretched polyester film samples is 1 cm in width and 1 cm in length.

8. A method for preparing a stretched polyester film according to claim 1, which comprises:
polymerizing a diol component and a dicarboxylic acid component to prepare a crystalline polyester resin;
preparing a stretched sheet from the polyester resin; and
heat-setting the stretched sheet,
wherein a heat shrinkage rate of the stretched polyester film at 80° C. in main shrinkage direction is 40% or more, and, upon a first thermal treatment and a second thermal treatment, a first melting temperature ($T_{m1}$) and a second melting temperature ($T_{m2}$) appear when the stretched polyester film is analyzed by differential scanning calorimetry (DSC),
wherein the first melting temperature ($T_{m1}$) is 150 to 230° C., the second melting temperature ($T_{m2}$) is 150 to 230° C., and the first melting temperature ($T_{m1}$) and the second melting temperature ($T_{m2}$) are different from each other,
wherein a difference ($|T_{m1}-T_{m2}|$) between the first melting temperature ($T_{m1}$) and the second melting temperature ($T_{m2}$) is in a range of 10 to 60° C.,
wherein the first thermal treatment temperature is 60 to 105° C.,
wherein the second thermal treatment temperature is 140 to 220° C., and
wherein a ratio ($H_1/H_2$) of a first heat of fusion ($H_1$) at the first melting temperature ($T_{m1}$) to a second heat of fusion ($H_2$) at the second melting temperature ($T_{m2}$) is 0.1 to 10.

9. The method for preparing a stretched polyester film of claim 8, wherein the first thermal treatment temperature is 60 to 105° C.

10. The method for preparing a stretched polyester film of claim 8, wherein the second thermal treatment temperature is 140 to 220° C.

* * * * *